(12) United States Patent
Yao et al.

(10) Patent No.: US 11,339,073 B2
(45) Date of Patent: May 24, 2022

(54) SWRO AND MCDI COUPLED SEAWATER DESALINATION DEVICE SYSTEM WITH ENERGY RECOVERY

(71) Applicant: JIANGSU UNIVERSITY OF SCIENCE AND TECHNOLOGY, Jiangsu (CN)

(72) Inventors: Shouguang Yao, Jiangsu (CN); Mengting Ji, Jiangsu (CN)

(73) Assignee: JIANGSU UNIVERSITY OF SCIENCE AND TECHNOLOGY, Jiangsu (CN)

(*) Notice: Subject to any disclaimer, the term of this patent is extended or adjusted under 35 U.S.C. 154(b) by 0 days.

(21) Appl. No.: 17/251,177

(22) PCT Filed: Dec. 4, 2019

(86) PCT No.: PCT/CN2019/122900
§ 371 (c)(1),
(2) Date: Dec. 10, 2020

(87) PCT Pub. No.: WO2021/000516
PCT Pub. Date: Jan. 7, 2021

(65) Prior Publication Data
US 2021/0171382 A1    Jun. 10, 2021

(30) Foreign Application Priority Data

Jul. 2, 2019  (CN) .......................... 201910591890.0
Aug. 5, 2019  (CN) .......................... 201910715010.6

(51) Int. Cl.
*B01D 29/56*  (2006.01)
*B01D 61/02*  (2006.01)
(Continued)

(52) U.S. Cl.
CPC ................ *C02F 9/00* (2013.01); *B01D 29/56* (2013.01); *B01D 39/1623* (2013.01);
(Continued)

(58) Field of Classification Search
CPC ............ B01D 61/06; B01D 2311/2684; B01D 2313/246; C02F 1/441; C02F 1/4691; C01F 2303/10
See application file for complete search history.

(56) References Cited

U.S. PATENT DOCUMENTS

2013/0146541 A1  6/2013  Weigel et al.

FOREIGN PATENT DOCUMENTS

| CN | 101331088 | 12/2008 |
| CN | 101581328 | 11/2009 |

(Continued)

OTHER PUBLICATIONS

Lee, Jae-Bong, et al. "Desalination of a thermal power plant wastewater by membrane capacitive deionization." Desalination 196.1-3 (2006): 125-134. (Year: 2006).*

(Continued)

Primary Examiner — Bradley R Spies
(74) Attorney, Agent, or Firm — JCIP Global Inc.

(57) ABSTRACT

The present invention discloses an SWRO and MCDI coupled seawater desalination device system with energy recovery, including a pre-filtering unit, an SWRO treatment unit, an MCDI treatment unit, and a post-filtering unit. The SWRO treatment unit is coupled with the MCDI treatment unit. Seawater desalination is performed through a coupling complementary water passage and circuit design, while water quality is improved, and the continuity of water output from a water passage of the device is kept. By recovering the pressure potential energy of high-pressure brine in the SWRO treatment unit and electric energy released by des- (Continued)

orption in the MCDI treatment unit, energy consumption is reduced.

8 Claims, 6 Drawing Sheets

(51) Int. Cl.
| | |
|---|---|
| *B01D 61/04* | (2006.01) |
| *B01D 61/06* | (2006.01) |
| *B01D 61/08* | (2006.01) |
| *B01D 61/48* | (2006.01) |
| *B01D 61/54* | (2006.01) |
| *B01D 61/58* | (2006.01) |
| *C02F 1/44* | (2006.01) |
| *C02F 1/469* | (2006.01) |
| *C02F 103/08* | (2006.01) |
| *C02F 9/00* | (2006.01) |
| *B01D 39/16* | (2006.01) |
| *B01D 39/20* | (2006.01) |
| *C02F 1/00* | (2006.01) |
| *C02F 101/10* | (2006.01) |

(52) U.S. Cl.
CPC ....... *B01D 39/2055* (2013.01); *B01D 61/025* (2013.01); *B01D 61/04* (2013.01); *B01D 61/06* (2013.01); *B01D 61/08* (2013.01); *B01D 61/48* (2013.01); *B01D 61/54* (2013.01); *B01D 61/58* (2013.01); *C02F 1/008* (2013.01); *B01D 2311/04* (2013.01); *B01D 2311/06* (2013.01); *B01D 2311/2649* (2013.01); *B01D 2311/2684* (2013.01); *B01D 2313/243* (2013.01); *B01D 2313/246* (2013.01); *C02F 1/001* (2013.01); *C02F 1/441* (2013.01); *C02F 1/4691* (2013.01); *C02F 2101/10* (2013.01); *C02F 2103/08* (2013.01); *C02F 2201/005* (2013.01); *C02F 2301/066* (2013.01); *C02F 2301/08* (2013.01); *C02F 2303/10* (2013.01)

(56) References Cited

FOREIGN PATENT DOCUMENTS

| | | | |
|---|---|---|---|
| CN | 102786174 | | 11/2012 |
| CN | 103253818 | | 8/2013 |
| CN | 103977708 | | 8/2014 |
| CN | 102588240 | | 10/2014 |
| CN | 206985913 U | * | 2/2018 |
| CN | 107746097 | | 3/2018 |
| CN | 207243648 | | 4/2018 |
| CN | 110316884 | | 10/2019 |
| KR | 20170002047 | | 1/2017 |

OTHER PUBLICATIONS

Hu Yuzhi—CN 206985913 U machine translation—Feb. 2018 (Year: 2018).*
Yu Du et al—CN 101331088 A machine translation—Dec. 2008 (Year: 2008).*
Qian Zhang et al—CN 102577240 A machine translation—Jul. 2012 (Year: 2012).*
Xiao Min et al—CN 107746097 A machine translation—Mar. 2018 (Year: 2018).*
"International Search Report (Form PCT/ISA/210)"of PCT/CN2019/122900, dated Mar. 27, 2020, pp.1-5.
"Written Opinion of the International Searching Authority (Form PCT/ISA/237)" of PCT/CN2019/122900, dated Mar. 27, 2020, pp. 1-5.

* cited by examiner

SWRO AND MCDI COUPLED SEAWATER DESALINATION DEVICE SYSTEM WITH ENERGY RECOVERY

CROSS-REFERENCE TO RELATED APPLICATION

This application is a 371 of international application of PCT application serial no. PCT/CN2019/122900, filed on Dec. 4, 2019, which claims the priority benefits of China application no. 201910591890.0, filed on Jul. 2, 2019 and China application no. 201910715010.6, filed on Aug. 5, 2019. The entirety of each of the above-mentioned patent applications is hereby incorporated by reference herein and made a part of this specification.

TECHNICAL FIELD

The present invention relates to a seawater desalination device, and more particularly relates to a seawater desalination device system with energy recovery.

BACKGROUND ART

With overfishing and serious pollution offshore, people are turning their attention to the deep sea, and marine ranching is the new hope of China's fishery transformation, which also means that more and more fishing vessels are going to the deep sea under the background of China's development agenda. However, to achieve long-time long-distance fishing vessel sailing, fresh water is one of the important factors determining whether the vessel can continue sailing, and a water storage tank carried therewith cannot guarantee the quality of fresh water resources and occupy a large area. With the increasing maturity of the seawater desalination technology and the reduction of process cost, a seawater desalination device may become an effective choice for fresh water production.

The existing seawater desalination methods mostly adopt a thermal method and a membrane method. A reverse osmosis (RO) method is dominant in the market due to its relatively low energy consumption, compact structure and the like, and its energy consumption is proportional to its desalination rate. However, although the seawater reverse osmosis (SWRO) primary desalination can reach the concentration of direct-drinking water, excess divalent ions such as boron ions harmful to the human body remain in produced water. If the ions are to be removed, BWRO secondary reverse osmosis is needed, the energy consumption is greatly improved, and the produced fresh water is acidic. Studies have shown that primary RO produced water is more corrosive to metals than seawater. Compared with the traditional desalination technology, membrane capacitive deionization (MCDI), a new seawater desalination method, has lower energy consumption and no secondary pollution, can effectively remove divalent ions, but is not dominant in desalination at high-concentration areas for the current technology. However, the experimental results of S. Porada, R. et al show that MCDI is superior to RO in energy consumption and dominates in treating seawater with low ion concentration (less than 30 mM).

With the increasing maturity of the reverse osmosis membrane technology, the demand of the seawater desalination machine market is increasing year by year. A small reverse osmosis seawater desalination device faces a common problem that the energy consumption is far greater than that of seawater desalination engineering and the energy consumption per ton of water may reach 10 kWh to 20 kWh. The high-pressure concentrated seawater in front of the reverse osmosis membrane cannot be well utilized and is wasted, and if the energy is utilized, the unit energy consumption of seawater desalination by the reverse osmosis membrane method can be greatly reduced. A suitable high-pressure energy recovery device is the key to reduce the energy consumption of the small reverse osmosis membrane seawater desalination device. The membrane capacitive deionization device itself is an energy storage device, which releases energy in the desorption process, and the design of a reasonable energy recovery scheme can supplement a part of energy consumption of the device.

In a seawater desalination device and method (Country: China, Publication No: 102786174A, Publication Date: 2012 Nov. 21), a method of combining an electrolytic purification system, a capacitive adsorption deionization system and a low-pressure reverse osmosis system is disclosed, and a membrane capacitive deionization desalination device is put in front of a reverse osmosis device without consideration of CDI energy recovery. In preparation equipment for ship drinking water (Country: China, Publication No: 207243648U, Publication Date: 2018-4-17), a method of combining ultra-filtration, membrane capacitive deionization, and a reverse osmosis device is disclosed, and a capacitive adsorption deionization system is also put in front of a reverse osmosis system without energy recovery. The patent with Publication No: CN102588240B discloses a self-pressurization energy recovery pressure pump. Two pistons and a piston rod are arranged in an energy recovery device. The area of contact between the pistons and a seawater chamber is larger than the area of contact between high-pressure concentrated seawater and the pistons, so that raw seawater cannot reach the water supply pressure required by RO primary desalination equipment through the energy recovery device, and the water supply pressure required by a reverse osmosis membrane can be provided only by further pressurizing through a medium-pressure pump. Therefore, the self-pressurization energy recovery pressure pump does not belong to pure mechanical pressurization, has low energy recovery rate, and requires additional power supply. Moreover, the energy recovery device works in cooperation with the medium-pressure pump, the water supply pressure required by the reverse osmosis membrane cannot be provided at the beginning, and it takes a certain time for the system to slowly accumulate to work normally.

SUMMARY OF THE INVENTION

The SWRO treatment unit includes a seawater desalination water passage including a high-pressure pump and an RO primary desalination equipment, and a self-pressurization energy recovery device. Pretreated seawater obtained after raw seawater being treated by the pre-filtering unit is connected to the RO primary desalination equipment through the high-pressure pump. The pretreated seawater is desalinated in a high-concentration section in the RO primary desalination equipment to obtain high-pressure concentrated seawater and primary fresh seawater. The high-pressure concentrated seawater flows into the self-pressurization energy recovery device to pressurize the pretreated seawater flowing into the self-pressurization energy recovery device, so that the pretreated seawater is pressurized to a pressure required by the RO primary desalination equipment. The high-pressure concentrated seawater is discharged after depressurized. The pretreated seawater is connected to the RO primary desalination equipment after pressurized to realize continuous water passage desalination and continuous recovery of high-pressure brine energy.

The MCDI treatment unit includes an MCDI assembly A, an MCDI assembly B, and an MCDI assembly C arranged in parallel. The MCDI assembly A desalinates the primary fresh seawater in a low-concentration section to obtain secondary fresh seawater. The MCDI assembly B performs desorption after adsorption and saturation and charges the MCDI assembly C at the same time. Wastewater is discharged after the desorption by the MCDI assembly B. The MCDI assembly A, the MCDI assembly B, and the MCDI assembly C work sequentially and alternately to realize continuous water passage desalination and continuous recovery of energy released during the desorption by the MCDI assembly. The secondary fresh seawater is connected to the post-filtering unit to be treated to obtain direct-drinking fresh water.

Further, the pre-filtering unit includes a raw water pump, a multi-medium filter, and a micro-filter sequentially connected through a pipeline, and the raw seawater is treated by the raw water pump, the multi-medium filter, and the micro-filter to obtain the pretreated seawater.

Further, the post-filtering unit includes a polypropylene (PP) cotton filter and an active carbon filter sequentially connected through a pipeline, and the secondary fresh seawater is treated by the PP cotton filter and the active carbon filter to obtain the direct-drinking fresh water.

Further, the self-pressurization energy recovery device in the SWRO treatment unit includes: a reversing valve, a center valve block, a pilot valve, a hydraulic cylinder A, and a hydraulic cylinder B.

For the center valve block, two side walls of the center valve block are connected with a hydraulic cylinder A and a hydraulic cylinder B respectively. A piston assembly is provided in the hydraulic cylinder A and the hydraulic cylinder B. A piston rod hole is formed in the center valve block. Two ends of a piston rod of the piston assembly extend into the hydraulic cylinder A and the hydraulic cylinder B respectively, and a rod body of the piston rod penetrates through the piston rod hole. A pilot valve channel is arranged in a lower part of the center valve block and configured to place the pilot valve. A reversing valve channel is arranged in an upper part of the center valve block and configured to place the reversing valve. A plurality of flow passages are arranged in the center valve block.

For the hydraulic cylinder A and the hydraulic cylinder B, the hydraulic cylinder A and the hydraulic cylinder B are divided into six chambers by the piston assembly. The piston assembly sequentially divides the hydraulic cylinder A into a seawater chamber A, a transition chamber A, and a concentrated water chamber A from left to right. The piston assembly sequentially divides the hydraulic cylinder B into a seawater chamber B, a transition chamber B, and a concentrated water chamber B from right to left. A cross sectional area of the seawater chambers is smaller than a cross sectional area of the concentrated water chambers.

For the pilot valve, the pilot valve is located between the concentrated water chamber A and the concentrated water chamber B, and two ends of a valve rod of the pilot valve extend to the concentrated water chamber A and the concentrated water chamber B respectively. Five holes are formed in the pilot valve channel, namely, an outflow hole I, an inflow/outflow hole II, an inflow hole III, an inflow/outflow hole IV, and an outflow hole V from left to right. The outflow hole I is communicated with a discharged seawater outlet end to form a ninth channel, the outflow hole V is communicated with the discharged seawater outlet end to form a tenth channel, and the inflow hole III is communicated with a seawater inlet end to form a first channel.

For the reversing valve, a seawater hole I, a concentrated water hole II, a concentrated water hole III, a concentrated water hole IV, a concentrated water hole V, a concentrated water hole VI, and a seawater hole VII are formed in the reversing valve channel from left to right respectively. The seawater hole I is communicated with the inflow/outflow hole II of the pilot valve to form a second channel, the seawater hole VII is communicated with the inflow/outflow hole IV of the pilot valve to form a third channel, the concentrated water hole II and a depressurized concentrated seawater outlet form a seventh channel, the concentrated water hole VI and the depressurized concentrated seawater outlet form an eighth channel, the concentrated water hole III is communicated with the concentrated water chamber A to form a fourth channel, the concentrated water hole V is communicated with the concentrated water chamber B to form a fifth channel, and the concentrated water hole IV is communicated with a high-pressure concentrated seawater inlet end to form a sixth channel.

For a check valve A, a check valve B, a check valve C, and a check valve D, a rectangular flow passage is formed in the center valve block. The check valve A, the check valve B, the check valve D, and the check valve C are sequentially arranged at four top corners of the rectangular flow passage counterclockwise. The seawater chamber A is communicated with the check valve A and the check valve C through a flow passage, and the seawater chamber B is communicated with the check valve B and the check valve D through a flow passage. Thrust required for pushing the check valve A and the check valve B open is smaller than thrust required for pushing the check valve C and the check valve D open. The pretreated seawater flows to the seawater chamber A from the check valve A, and the high-pressure seawater of the seawater chamber A flows to the check valve C and makes the check valve C opened and the check valve A closed. The pretreated seawater flows to the seawater chamber B from the check valve B, and the high-pressure seawater of the seawater chamber B flows to the check valve D and makes the check valve D opened and the check valve B closed.

By adopting the above technical solution, the high-pressure concentrated seawater controls the movement of the piston assembly. When the piston assembly moves to a position close to a limit position, the pilot valve is pushed to move, the pilot valve controls the reversing valve to be reversed, the reversing valve also moves accordingly, and purpose of alternately pressurizing and depressurizing the hydraulic cylinder A and the hydraulic cylinder B is achieved. The check valve A and the check valve B control the inflow of the low-pressure raw seawater, and the check valve C and the check valve D control the outflow of the pressurized seawater.

Further, each of the MCDI assembly A, the MCDI assembly B, and the MCDI assembly C includes 4N MCDI modules connected in parallel. N is a positive integer.

Further, the MCDI module includes a shell, a partition plate, an anion-cation exchange membrane, and an electrode, a primary fresh seawater inlet, a secondary fresh seawater outlet, a pretreated seawater inlet, and a wastewater outlet are formed in the shell, and a space formed by the shell and the electrode forms a parallel internal water flow channel.

Further, the MCDI treatment unit controls switching of different circuits through an electric control unit to recover energy stored in the MCDI assembly.

Further, the different circuits are sequentially a parallel-serial circuit, a parallel-parallel circuit, a parallel-parallel-serial-parallel circuit, a parallel-serial-parallel-parallel circuit, and a serial-parallel circuit.

Further, the SWRO treatment unit performs desalination in the high-concentration section to desalinate the pretreated seawater with the ion concentration of 35,000 mg/L to the primary fresh seawater with the ion concentration of about 1,700 mg/L, and the MCDI treatment unit performs desalination in the low-concentration section to desalinate the primary fresh seawater with the ion concentration of about 1,700 mg/L to the secondary fresh seawater with the ion concentration of 500 mg/L or below.

DETAILED DESCRIPTION OF THE INVENTION

The present invention will be further clarified with reference to the drawings and specific embodiments which are intended only to illustrate the present invention and are not intended to limit the scope of the present invention.

Figure 1:
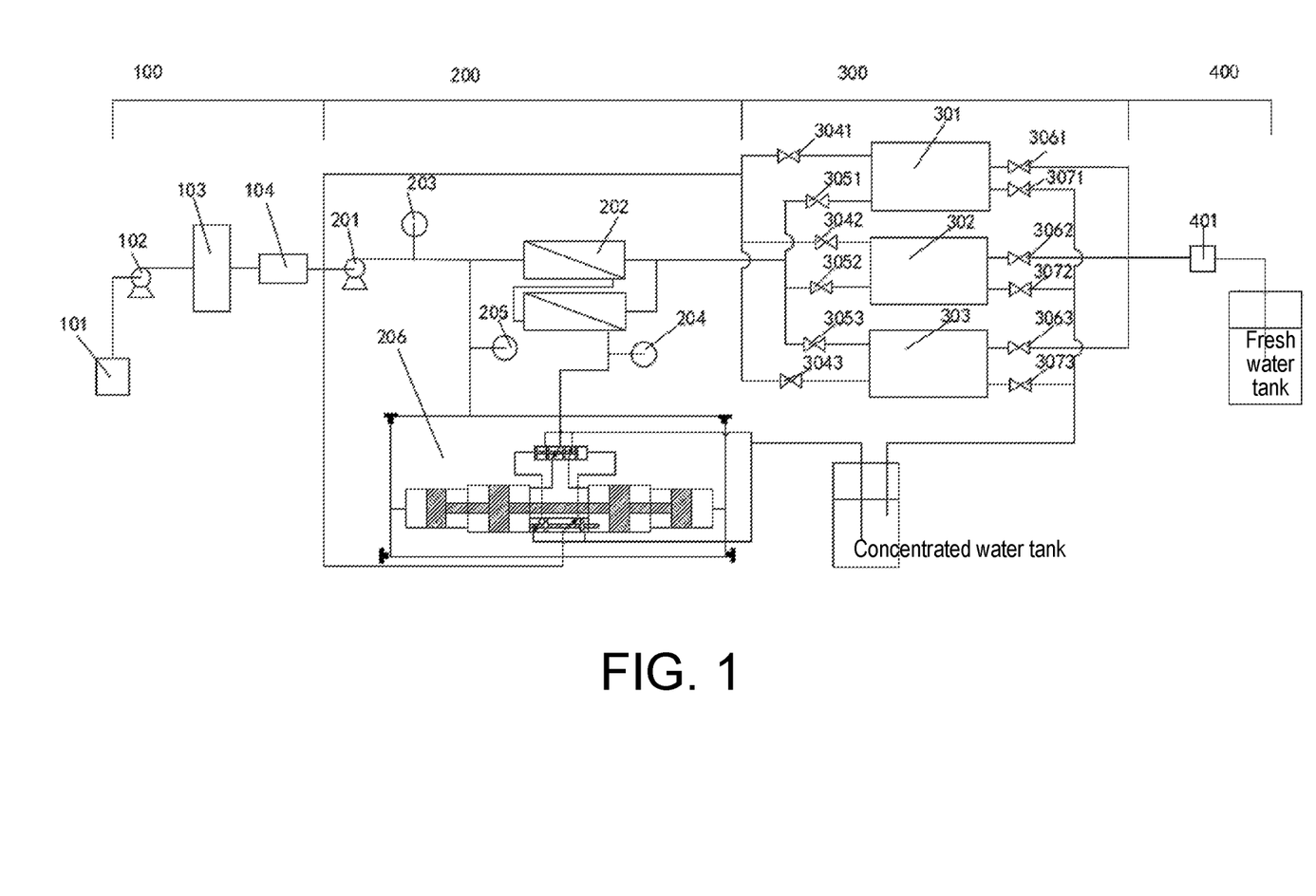
FIG. 1 is a schematic diagram of a seawater desalination device system of the present invention.

An SWRO and MCDI coupled seawater desalination device system with energy recovery, as shown in FIG. 1, includes a pre-filtering unit 100, an SWRO treatment unit 200, an MCDI treatment unit 300, and a post-filtering unit 400.

The pre-filtering unit 100 includes a raw water tank 101, a raw water pump 102, a multi-medium filter 103, and a micro-filter 104 sequentially connected through a pipeline. Raw seawater is connected to the raw water tank for storage, and then is treated by the raw water pump, the multi-medium filter, and the micro-filter. The raw seawater is subjected to preliminary impurity filtration to obtain the pretreated seawater.

The SWRO treatment unit 200 includes a seawater desalination water passage 202 including a high-pressure pump 201 and an RO primary desalination equipment, a pressure gage A 203, a pressure gage B 204, a pressure gage C 205, and a self-pressurization energy recovery device 206. Pretreated seawater obtained after the raw seawater being treated by the pre-filtering unit is connected to the RO primary desalination equipment through the high-pressure pump. The pretreated seawater is desalinated in a high-concentration section in the RO primary desalination equipment to obtain high-pressure concentrated seawater and primary fresh seawater. The high-pressure concentrated seawater flows into the self-pressurization energy recovery device to pressurize the pretreated seawater flowing into the self-pressurization energy recovery device, so that the pretreated seawater is pressurized to a pressure required by the RO primary desalination equipment. The high-pressure concentrated seawater is discharged after depressurized. The pretreated seawater is connected to the RO primary desalination equipment after pressurized to realize continuous water passage desalination and continuous recovery of high-pressure brine energy. The pressure gage A measures the pressure of the pretreated seawater pressurized by the high-pressure pump, the pressure gage B measures the pressure of the high-pressure concentrated seawater flowing out of the RO primary desalination equipment, and the pressure gage C measures the pressure of the pretreated seawater pressurized by the self-pressurization energy recovery device. The measured values of the pressure gage A and the pressure gage C should be equivalent.

Figure 2:
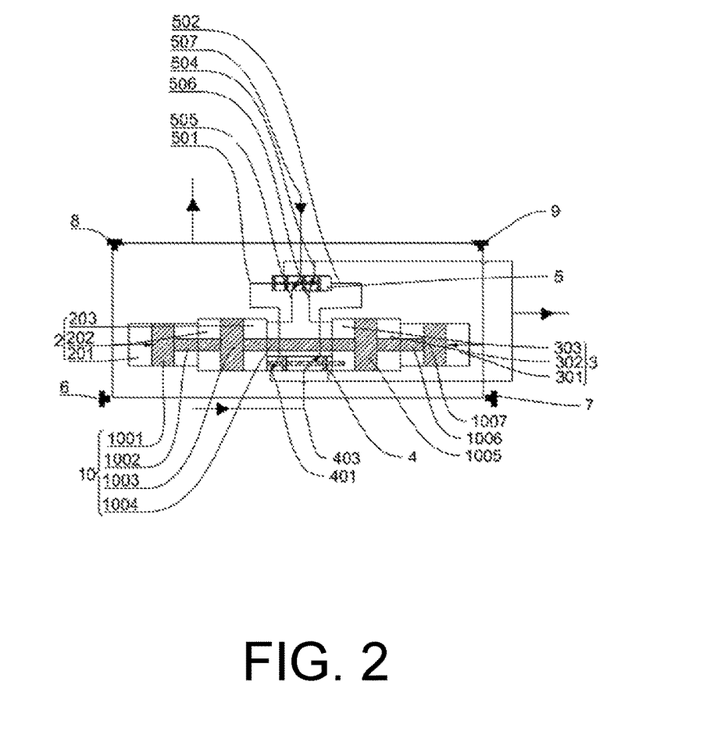
FIG. 2 is a state diagram of an energy recovery device in an initial starting stage.

As shown in FIG. 2, the self-pressurization energy recovery device in the SWRO treatment unit includes a center valve block 1, a pilot valve 4, a reversing valve 5, a piston assembly 10, two hydraulic cylinders, a plurality of flow passages, and four check valves (a check valve A 6, a check valve B 7, a check valve D 9, and a check valve C 8 respectively starting from the lower left corner and rotating in a counterclockwise direction).

For the center valve block 1, two side walls of the center valve block 1 are connected with a hydraulic cylinder A 2 and a hydraulic cylinder B 3 respectively. The piston assembly 10 is provided in the hydraulic cylinder A 2 and the hydraulic cylinder B 3. A piston rod hole is formed in the center valve block 1. Two ends of a piston rod of the piston assembly 10 extend into the hydraulic cylinder A 2 and the hydraulic cylinder B 3 respectively, and a rod body of the piston rod penetrates through the piston rod hole. A pilot valve channel is arranged in a lower part of the center valve block 1 and configured to place the pilot valve 4. A reversing valve channel is arranged in the center valve block 1 and configured to place the reversing valve 5. The plurality of flow passages are arranged in the center valve block 1.

For the hydraulic cylinder A 2 and the hydraulic cylinder B 3, the hydraulic cylinder A 2 and the hydraulic cylinder B 3 are divided into six chambers by the piston assembly 10. The piston assembly 10 sequentially divides the hydraulic cylinder A 2 into a seawater chamber A 201, a transition chamber A 202, and a concentrated water chamber A 203 from left to right. The piston assembly 10 sequentially divides the hydraulic cylinder B 3 into a seawater chamber B 301, a transition chamber B 302, and a concentrated water chamber B 303 from right to left. A cross sectional area of the seawater chambers is smaller than a cross sectional area of the concentrated water chambers.

The hydraulic cylinder A and the hydraulic cylinder B have the same structure, and are symmetrically arranged on two sides of the center valve block 1.

For the pilot valve 4, the pilot valve 4 is located between the concentrated water chamber A 203 and the concentrated water chamber B 303, and two ends of a valve rod of the pilot valve 4 extend to the concentrated water chamber A 203 and the concentrated water chamber B 303 respectively. Five holes are formed in the pilot valve channel, namely, an outflow hole I, an inflow/outflow hole II, an inflow hole III, an inflow/outflow hole IV, and an outflow hole V from left to right. The outflow hole I is communicated with a low-pressure seawater outlet I to form a ninth channel 401. The outflow hole V is communicated with a low-pressure seawater outlet II to form a tenth channel 402. The inflow hole III is communicated with a seawater inlet end to form a first channel 403.

For the reversing valve 5, a seawater hole I, a concentrated water hole II, a concentrated water hole III, a concentrated water hole IV, a concentrated water hole V, a concentrated water hole VI, and a seawater hole VII are formed in the reversing valve channel from left to right respectively. The seawater hole I is communicated with the inflow/outflow hole II of the pilot valve 4 to form a second channel 501. The seawater hole VII is communicated with the inflow/outflow hole IV of the pilot valve 4 to form a third channel 502. The concentrated water hole II and a depressurized concentrated seawater outlet 104 form a seventh channel 503. The concentrated water hole VI and the depressurized concentrated seawater outlet 104 form an eighth channel 504. The concentrated water hole III is communicated with the concentrated water chamber A to form a fourth channel 505. The concentrated water hole V is communicated with the concentrated water chamber B to form a fifth channel 506. The concentrated water hole IV is communicated with a high-pressure concentrated seawater inlet end 103 to form a sixth channel 507.

For the check valve A 6, the check valve B 7, the check valve C 8, and the check valve D 9, a rectangular flow passage is formed in the center valve block 1. The check valve A 6, the check valve B 7, the check valve D 9, and the check valve C 8 are sequentially arranged at vertical edges of the rectangular flow passage and four top corners of the rectangular flow passage counterclockwise. The seawater chamber A 201 is communicated with the check valve A 6 and the check valve C 8 through a flow passage, and the seawater chamber B 301 is communicated with the check valve B 7 and the check valve D 9 through a flow passage. A thrust required for pushing the check valve A 6 and the check valve B 7 open is smaller than a thrust required for pushing the check valve C 8 and the check valve D 9 open. The pretreated seawater flows to the seawater chamber A 201 from the check valve A 6, and the high-pressure seawater of the seawater chamber A 201 flows to the check valve C 8 and makes the check valve C opened and the check valve A 6 closed. The pretreated seawater flows to the seawater chamber B 301 from the check valve B 7, and the high-pressure seawater of the seawater chamber B 301 flows to the check valve D 9 and makes the check valve D opened and the check valve B 7 closed.

The self-pressurization energy recovery device of the SWRO treatment unit is divided into an initial starting stage and a continuous working stage.

As shown in FIG. 2, in the initial starting stage, the pretreated seawater flowing through the pre-filtering unit 100 flows into the first channel 403, the valve rod of the pilot valve 4 is located at the rightmost side of a hole passage of the pilot valve 4, the first channel 403 is communicated with the third channel 502, and the pretreated seawater flowing out of the pre-filtering unit 100 flows into a right chamber of the reversing valve 5 along the first channel 403 and the third channel 502, so that the reversing valve 5 moves to the leftmost side. The second channel 501 of the reversing valve 5 is communicated with the ninth channel 401, the sixth channel 507 is communicated with the fourth channel 505, the fifth channel 506 is communicated with the eighth channel 504, the check valve A 6 and the check valve B 7 are opened by the thrust of the pretreated seawater while the pretreated seawater flows into the first channel 403, and the pretreated seawater simultaneously enters the seawater chamber A and the seawater chamber B. Meanwhile, the pretreated seawater flows into the high-pressure pump to be pressurized to a water supply pressure and then flows into the RO primary desalination equipment, the high-pressure concentrated seawater flowing out of the RO primary desalination equipment flows into the fourth channel 505 along the sixth channel 507 and finally enters the concentrated water chamber A to push the piston assembly 10 to move leftward. Since the pretreated seawater in the seawater chamber A is pressurized to the water supply pressure, which is greater than the pressure of the pretreated seawater, the high-pressure seawater pushes the check valve C 8 open, and the check valve A 6 is closed. Meanwhile, the check valve B 7 is still in an open state, and the pretreated seawater flows into the seawater chamber B. When the piston assembly 10 moves leftward to a limit position, the pilot valve 4 is triggered to move leftward to the leftmost end of the pilot valve channel, and the system enters the continuous working stage.

Figure 3:
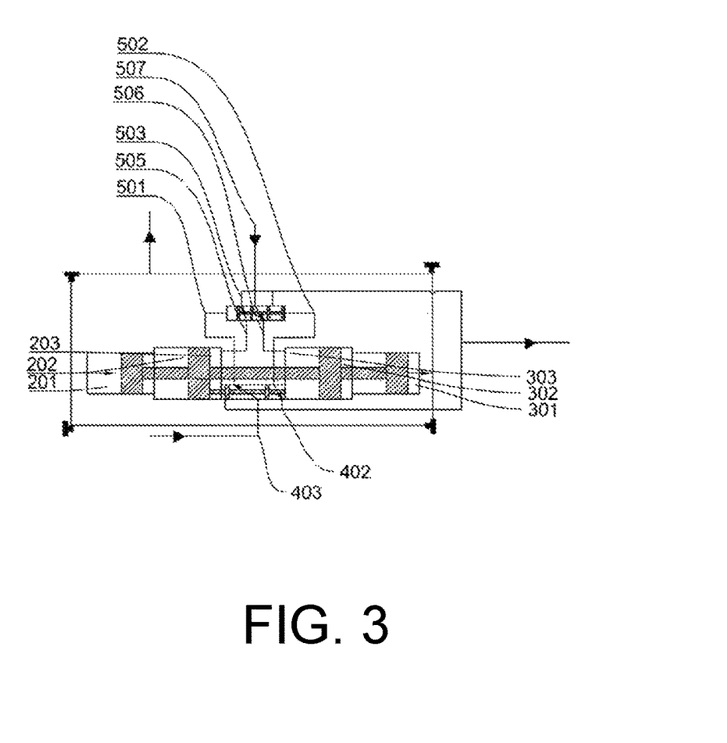
FIG. 3 is a schematic diagram of the energy recovery device that pressurizes at the right side and depressurizes at the left side in a continuous working stage.

When a reverse osmosis seawater desalination system is in the continuous working stage, if the pilot valve 4 is at the leftmost end of the hole passage of the pilot valve 4, as shown in FIG. 3, the first channel 403 is communicated with the second channel 501, the third channel 502 is communicated with the tenth channel 402, the pretreated seawater flows into a left chamber of the reversing valve 5 along the first channel 403 and the second channel 501 to push the reversing valve 5 to move rightward, the seawater in the right chamber of the reversing valve 5 flows to the tenth channel 402 along the third channel 502, and when the reversing valve 5 is pushed to the rightmost side, the sixth channel 507 is communicated with the fifth channel 506, so that the high-pressure concentrated seawater flows into the concentrated water chamber B 303 to push the piston assembly 10 to move rightward, the fourth channel 505 is communicated with the seventh channel 503, and the depressurized concentrated seawater is discharged from the concentrated water chamber A 203. When the piston assembly 10 moves rightward, the pretreated seawater in the seawater chamber B 301 is pressurized to the water supply pressure, and since the water supply pressure is greater than the pressure of the pretreated seawater, the high-pressure seawater pushes the check valve D 9 open, the check valve B 7 is closed, and the high-pressure seawater flows into the RO primary desalination equipment. Meanwhile, the sum of the pressure in the seawater chamber A 201 and the resistance of the check valve A 6 is smaller than the thrust of the pretreated seawater, the check valve A 6 is opened, the pretreated seawater flows into the seawater chamber A 201, and the check valve C 8 is closed since the thrust of the pretreated seawater is smaller than the resistance of the check valve C 8. When the piston moves rightward to a limit position, the pilot valve 4 is triggered to move rightward to the rightmost end of the pilot valve channel.

Figure 4:
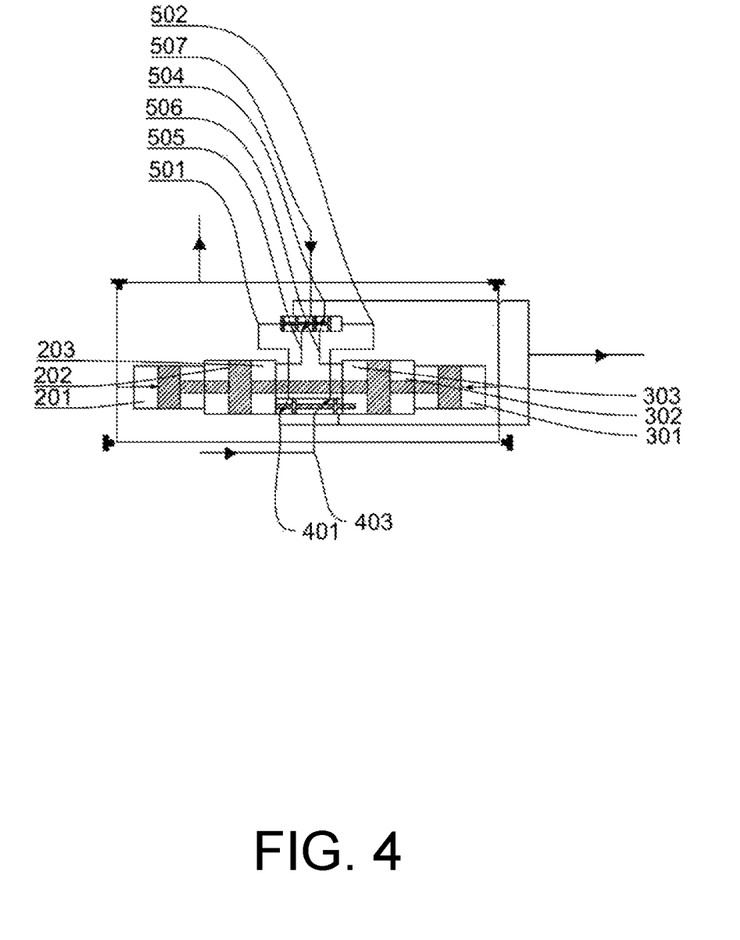
FIG. 4 is a schematic diagram of the energy recovery device that pressurizes at the left side and depressurizes at the right side in the continuous working stage.

When the pilot valve 4 is at the rightmost end of the pilot valve channel, as shown in FIG. 4, the first channel 403 is communicated with the third channel 502, the second channel 501 is communicated with the ninth channel 401, the pretreated seawater flows into the right chamber of the reversing valve 5 along the third channel 502 to push the reversing valve 5 to move leftward, the pretreated seawater in the left chamber of the reversing valve 5 flows to the ninth channel 401 along the second channel 501, and when the reversing valve 5 is pushed to the leftmost side, the sixth channel 507 is communicated with the fourth channel 505, the high-pressure concentrated seawater flows into the concentrated water chamber A 203 to push the piston assembly 10 to move leftward, the fifth channel 506 is communicated with the eighth channel 504, and the depressurized concentrated seawater is discharged from the concentrated water chamber B 303. When the piston assembly 10 moves rightward, the pretreated seawater in the seawater chamber A 201 is pressurized to the water supply pressure, and since the water supply pressure is greater than the pressure of the pretreated seawater, the high-pressure seawater pushes the check valve C 8 open, the check valve A 6 is closed, and the high-pressure seawater flows into the RO primary desalination equipment. Meanwhile, the sum of the pressure in the seawater chamber B 301 and the resistance of the check valve B 7 is smaller than the thrust of the pretreated seawater, the check valve B 7 is opened, the pretreated seawater flows into the seawater chamber B 301, and the check valve D 9 is closed since the thrust of the pretreated seawater is smaller than the resistance of the check valve D 9. When the piston moves leftward to the limit position, the pilot valve 4 is triggered to move leftward to the leftmost end of the pilot valve channel.

The pilot valve 4 is reversed leftward and rightward respectively to complete a working cycle in which the hydraulic cylinder A 2 and the hydraulic cylinder B 3 alternately perform pressurization and depressurization. The seawater desalination water passage is that the high-pressure pump and the RO primary desalination equipment are sequentially connected through a pipeline, a first branch is led out from an outlet of the micro-filter and connected to an inlet of the high-pressure pump, and the pretreated seawater is pressurized by the high-pressure pump and then desalinated in the high-concentration section in the RO primary desalination equipment. The pressure of the pretreated seawater pressurized by the high-pressure pump is measured by the pressure gage A. Two outlets are formed in the RO primary desalination equipment. High-pressure brine is discharged from one of the outlets and enters an energy recovery water passage. The pressure of the high-pressure concentrated seawater is measured by the pressure gage B. The primary fresh seawater is discharged from the other outlet and enters the MCDI treatment unit for secondary desalination.

The MCDI treatment unit 300 includes: an MCDI assembly A 301; an MCDI assembly B 302; an MCDI assembly C 303; a seawater inlet electromagnetic valve A 3041; a seawater inlet electromagnetic valve B 3042; a seawater inlet electromagnetic valve C 3043; a primary fresh seawater inlet electromagnetic valve A 3051; a primary fresh seawater inlet electromagnetic valve B 3052; a primary fresh seawater inlet electromagnetic valve C 3053; a wastewater electromagnetic valve A 3061; a wastewater electromagnetic valve B 3062; a wastewater electromagnetic valve C 3063; a secondary fresh seawater outlet electromagnetic valve A 3071; a secondary fresh seawater outlet electromagnetic valve B 3072; a secondary fresh seawater outlet electromagnetic valve C 3073; and MCDI modules 308.

Each of the MCDI assembly A 301, the MCDI assembly B 302, and the MCDI assembly C 303 includes at least 4N (N is a positive integer) MCDI modules, and one MCDI assembly is formed by connecting 4N MCDI modules 308 in parallel.

Figure 5:
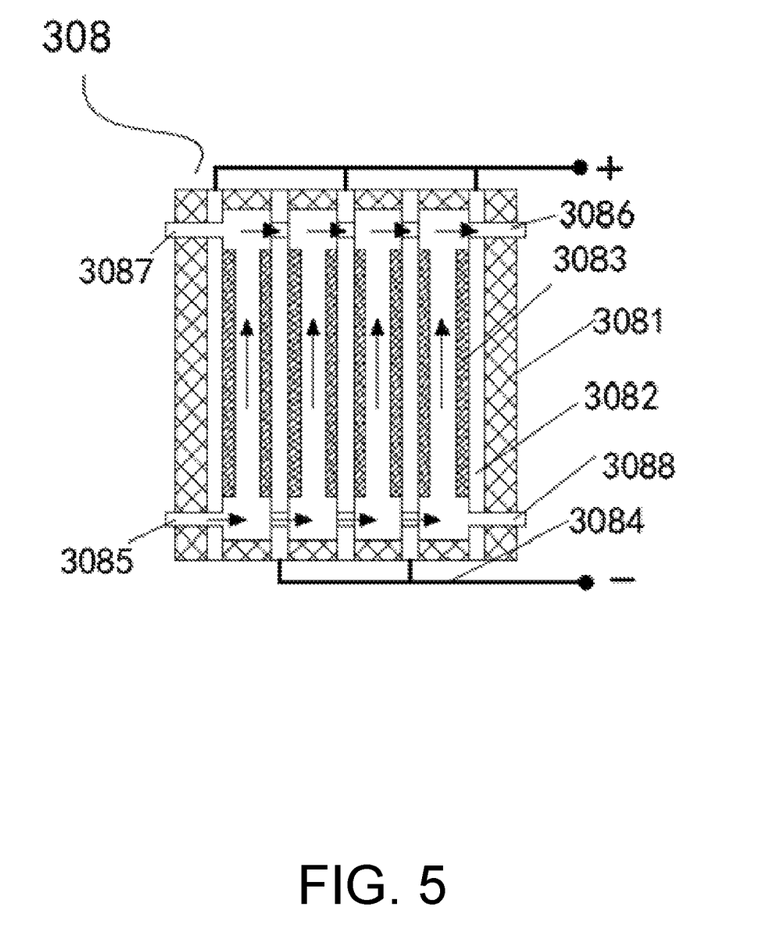
FIG. 5 is a schematic structural diagram of an MCDI module.

The MCDI module 308 includes a shell 3081, a partition plate 3082, an anion-cation exchange membrane 3083, and an electrode 3084. A primary fresh seawater inlet 3085, a secondary fresh seawater outlet 3086, a pre-treated seawater inlet 3087, and a wastewater outlet 3088 are formed in the shell 3081. A space formed by the shell 3081 and the electrode 3084 forms a parallel internal water flow channel in which a water flow forms a Z-shaped flow.

Each MCDI module is described as being composed of four MCDI modules 308. The four MCDI modules 308 are connected in parallel to form an MCDI assembly, the primary fresh seawater is connected to the primary fresh seawater inlet 3085, the primary fresh seawater enters the internal water flow channel to perform capacitive adsorption deionization desalination, and secondary fresh seawater is discharged from the secondary fresh seawater outlet 3086. Pre-treated seawater is connected to the pre-treated seawater inlet 3087, the pre-treated seawater enters the internal water flow channel to flush ions released during capacitive desorption, and wastewater is discharged from the wastewater outlet 3088.

The MCDI assembly A 301, the MCDI assembly B 302, and the MCDI assembly C 303 are arranged in parallel. The desalination process of the MCDI treatment unit is that when the MCDI assembly A 301 works, the primary fresh seawater inlet electromagnetic valve A 3051 and the secondary fresh seawater outlet electromagnetic valve A 3071 are opened, the primary fresh seawater enters the MCDI assembly A for desalination in a low-concentration section to obtain the secondary fresh seawater, the seawater electromagnetic valve B 3042 and the wastewater electromagnetic valve B 3062 are opened at the same time, the pre-treated seawater enters the MCDI assembly C 303, the MCDI assembly C 303 enters a desorption process and charges the MCDI assembly B 302 at the same time, the other electromagnetic valves are closed, and wastewater is discharged after the desorption by the MCDI assembly C 303; when the MCDI assembly A 301 reaches adsorption saturation, the primary fresh seawater inlet electromagnetic valve A 3051 and the secondary fresh seawater outlet electromagnetic valve A 3071 are closed, the primary fresh seawater inlet electromagnetic valve B 3052 and the secondary fresh seawater outlet electromagnetic valve B 3072 are opened, the primary fresh seawater enters the MCDI assembly B 302 for desalination in the low-concentration section to obtain the secondary fresh seawater, the seawater electromagnetic valve A 3041 and the wastewater electromagnetic valve A 3061 are opened at the same time, the pre-treated seawater enters the MCDI assembly A 301, the MCDI assembly A 301 enters a desorption process and charges the MCDI assembly C 303 at the same time, the other electromagnetic valves are closed, and wastewater is discharged after the desorption by the MCDI assembly A 301; and when the MCDI assembly B 302 reaches adsorption saturation, the primary fresh seawater inlet electromagnetic valve B 3052 and the secondary fresh seawater outlet electromagnetic valve B are closed, the primary fresh seawater inlet electromagnetic valve C 3053 and the secondary fresh seawater outlet electromagnetic valve C are opened, the primary fresh seawater enters the MCDI assembly C 303 for desalination in the low-concentration section to obtain the secondary fresh seawater, the seawater electromagnetic valve B 3042 and the wastewater electromagnetic valve B 3062 are opened at the same time, the pre-treated seawater enters the MCDI assembly B 302, the MCDI assembly B 302 enters a desorption process and charges the MCDI assembly A 301 at the same time, the other electromagnetic valves are closed, and wastewater is discharged after the desorption by the MCDI assembly B 302. The MCDI assembly A 301, the MCDI assembly B 302, and the MCDI assembly C 303 work sequentially and alternately, and energy stored in the MCDI assemblies controls switching of different circuits through an electric control unit to ensure the optimal electric energy recovery rate, thereby realizing continuous water passage desalination and continuous recovery of energy released during the desorption. The discharged secondary fresh seawater enters the post-filtering unit 400.

An energy recovery process of the MCDI treatment unit is that in the presence of the adsorption and desorption processes of the MCDI assemblies, the MCDI assemblies cannot perform desalination in the desorption process, so that the MCDI assembly A 301, the MCDI assembly B 302, and the MCDI assembly C 303 are designed to be used cyclically to ensure continuous water passage desalination and continuous recovery of electric energy. The circuit diagram is as shown in FIG. 6: when the MCDI assembly A 301 works, a switch A 3091 is closed to enable a direct current power supply 310 to supply residual electric quantity in the MCDI assembly A 301, the MCDI assembly C enters the desorption process, a switch E 3095 is closed at the same time to charge the MCDI assembly B 302, and remaining switches B 3092, C 3093, D 3094, and F 3096 are opened; when the MCDI assembly A 301 reaches adsorption saturation, the MCDI assembly B 302 works, the switch B is closed to enable the direct current power supply 310 to supply residual electric quantity in the MCDI assembly B 302, the MCDI assembly A 301 enters the desorption process, the switch F 3096 is closed at the same time to charge the MCDI assembly C 303, and the remaining switches A 3091, C 3093, D 3094, and E 3095 are opened; and when the MCDI assembly B 302 reaches adsorption saturation, the MCDI assembly C 303 works, the switch C is closed to enable the direct current power supply 310 to supply residual electric quantity in the MCDI assembly C 303, the MCDI assembly B 302 enters the desorption process, the switch D 3094 is closed at the same time to charge the MCDI assembly A 301, and the remaining switches A 3091, E 3095, F 3096, and B 3092 are opened.

Figure 6:
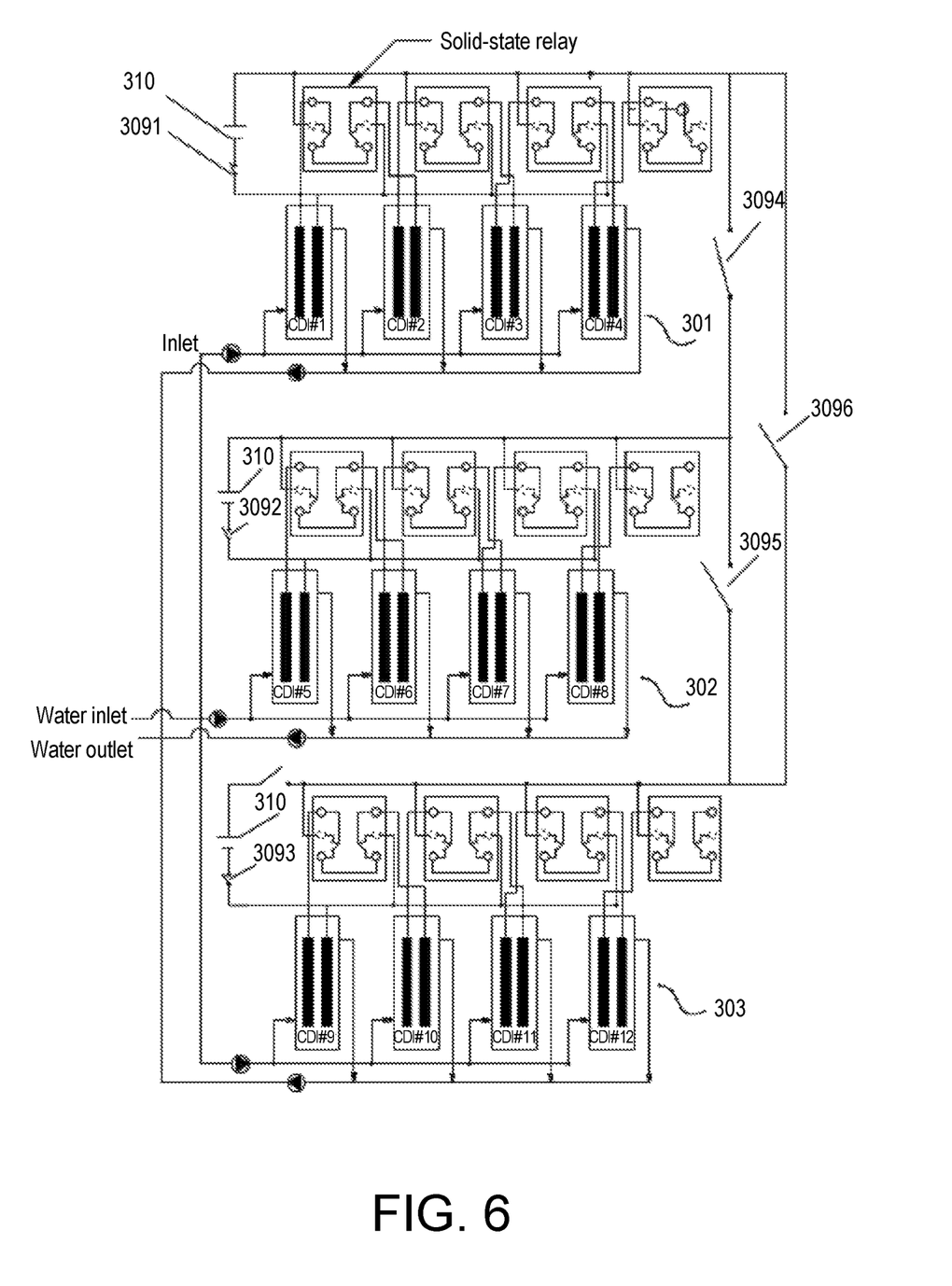
FIG. 6 is a circuit diagram of electric energy recovery of an MCDI treatment unit.
Figure 7:
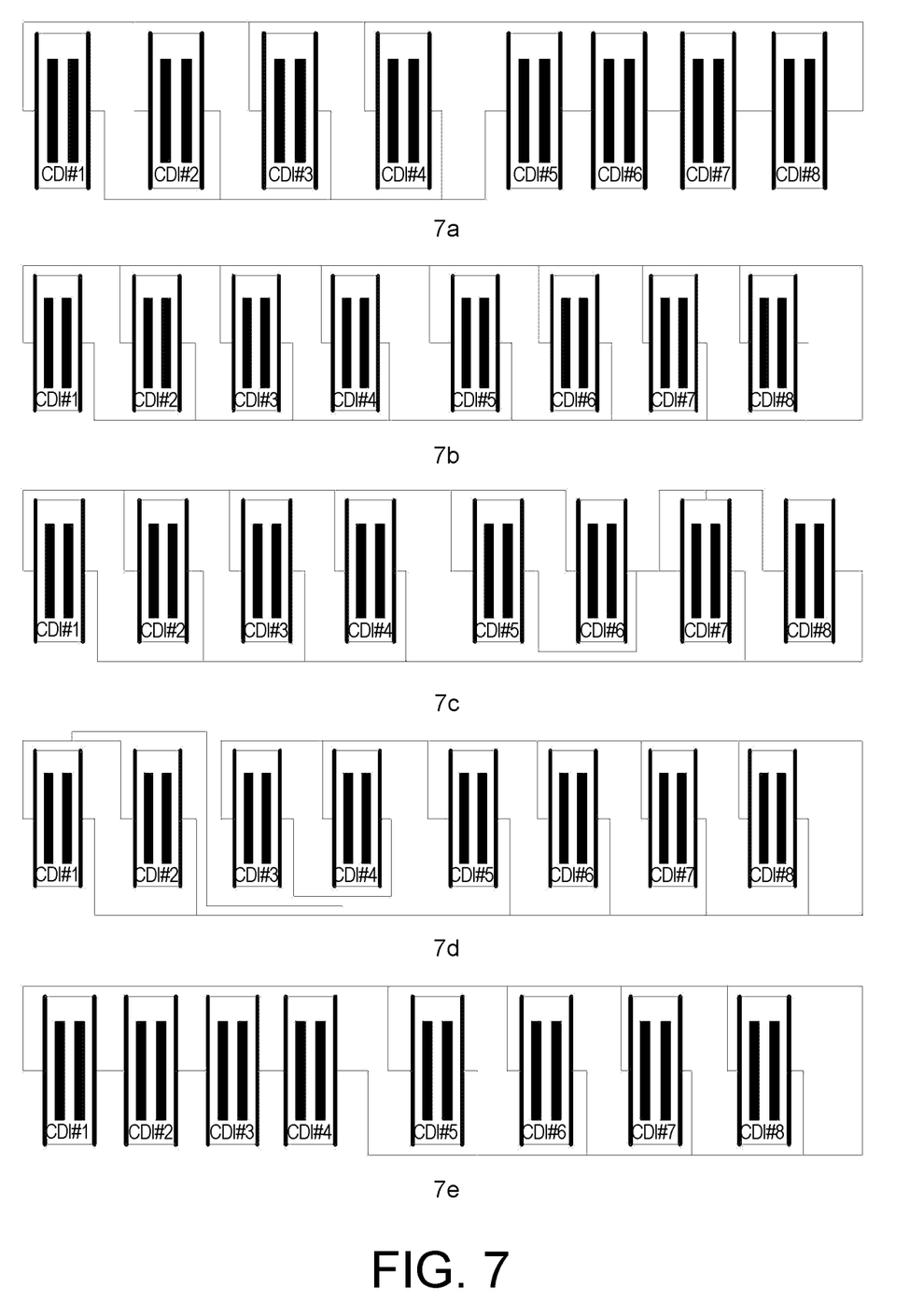
FIG. 7 is a circuit connection mode in which an electric control unit performs circuit control switching in the MCDI treatment unit.

The MCDI treatment unit recovers electric energy by adopting a circuit connection mode shown in FIG. 6, performs circuit control switching through the electric control unit, and sequentially switches according to a circuit connection mode shown in FIG. 7 (7a-7b-7c-7d-7e). The first four MCDI modules form one MCDI assembly, the last four MCDI modules form another MCDI assembly, 7a is a parallel-serial circuit, 7b is a parallel-parallel circuit, 7c is a parallel-parallel-serial-parallel circuit, 7d is a parallel-serial-parallel-parallel circuit, and 7e is a serial-parallel circuit. According to experimental verification, 70% of energy stored in each desorption MCDI assembly may be recovered by adopting the circuit connection mode of FIG. 3 and FIG. 4.

As shown in FIG. 1, the post-filtering unit 400 includes a PP cotton filter, an active carbon filter, and a fresh water tank sequentially connected through a pipeline. The secondary fresh seawater is treated by the PP cotton filter and the active carbon filter to further improve the taste of water, and direct-drinking fresh water is obtained and connected to the fresh water tank for storage.

One of the actual treatment capacity conditions of the seawater desalination device system of the present invention is as follows: the pretreated seawater with the ion concentration of 35,000 mg/L is desalinated to the primary fresh seawater with the ion concentration of about 1,700 mg/L, and then desalinated to the secondary fresh seawater with the ion concentration of 500 mg/L or below, so as to meet the direct-drinking water standard.

The principle and the function of the seawater desalination device system of the present invention are as follows: 1, the SWRO method for desalinating at high concentration is low in energy consumption and applicable to a moderate device, the MCDI method for desalinating at low concentration is low in energy consumption and applicable to a small device, the SWRO treatment unit and the MCDI treatment unit are coupled according to the advantages of the SWRO method and the MCDI method in respective concentration ranges, seawater desalination is performed through a coupling complementary water passage and circuit design, the continuity of water output is ensured, and the pressure potential energy of high-pressure brine in the SWRO treatment unit and electric energy released by desorption in the MCDI treatment unit are recovered, so that the energy consumption and cost of the whole seawater desalination device system are greatly reduced; 2, excess divalent ions such as boron harmful to the human body in fresh water after the traditional seawater desalination can be effectively removed through the MCDI treatment unit, the water quality is guaranteed, and high-quality pure water is prepared; 3, compared with the existing reverse osmosis (RO) seawater desalination technology, the present invention avoids the problems of high energy consumption caused by the combination of secondary SWRO and BWRO, and avoids the problems that the corrosion to metals is stronger than that of seawater due to the acidity of primary RO produced water, harmful divalent ions can be removed only by using a BWRO secondary reverse osmosis device originally, and the like; and 4, compared with the existing CDI seawater desalination system, the problem that the energy consumption of CDI seawater desalination is not dominant in the high-concentration range is solved, three MCDI assemblies are adopted in the MCDI treatment unit to work sequentially and alternately, and the problem of water passage discontinuity of a CDI device is solved.

Compared with an existing reverse osmosis (RO) and CDI seawater desalination energy recovery technology, the energy consumption can be further remarkably reduced, and the quality of fresh water produced can be improved.

Objective of the Invention: Aiming at the above problems, an objective of the present invention is to provide a seawater desalination device system with energy recovery, which improves the disadvantages of high energy consumption, difficult effective removal of harmful divalent ions, and the like of the existing seawater desalination device.

Technical Solution: An SWRO and MCDI coupled seawater desalination device system with energy recovery includes a pre-filtering unit, an SWRO treatment unit, an MCDI treatment unit, and a post-filtering unit.

Beneficial Effect: Compared with the prior art, the present invention has the following advantages: the SWRO treatment unit is coupled with the MCDI treatment unit in the seawater desalination device system. Seawater desalination is performed through a coupling complementary water passage and circuit design, while water quality is improved, and the continuity of water output from a water passage of the device is kept. By recovering the pressure potential energy of high-pressure brine in the SWRO treatment unit and electric energy released by desorption in the MCDI treatment unit, energy consumption is reduced. Compared with an existing reverse osmosis (RO) and CDI seawater desalination energy recovery technology, the energy consumption can be further remarkably reduced, and the quality of fresh water produced can be improved.

What is claimed is:

1. A seawater reverse osmosis (SWRO) and membrane capacitive deionization (MCDI) coupled seawater desalination device system with energy recovery, characterized in that the SWRO and MCDI coupled seawater desalination device system with energy recovery comprises a pre-filtering unit, an SWRO treatment unit, an MCDI treatment unit, and a post-filtering unit, wherein the SWRO treatment unit comprises a seawater desalination water passage comprising a high-pressure pump and an RO primary desalination equipment, and a self-pressurization energy recovery device, pretreated seawater obtained after raw seawater being treated by the pre-filtering unit is connected to the RO primary desalination equipment through the high-pressure pump, the pretreated seawater is desalinated in a high-concentration section in the RO primary desalination equipment to obtain high-pressure concentrated seawater and primary fresh seawater, the high-pressure concentrated seawater flows into the self-pressurization energy recovery device to pressurize the pretreated seawater flowing into the self-pressurization energy recovery device, so that the pretreated seawater is pressurized to a pressure required by the RO primary desalination equipment, the high-pressure concentrated seawater is discharged after depressurized, and the pretreated seawater is connected to the RO primary desalination equipment after pressurized to realize continuous water passage desalination and continuous recovery of high-pressure brine energy; and the MCDI treatment unit comprises an MCDI assembly A, an MCDI assembly B, and an MCDI assembly C arranged in parallel, the MCDI assembly A desalinates the primary fresh seawater in a low-concentration section to obtain secondary fresh seawater, the MCDI assembly B desorbs the pretreated seawater and charges the MCDI assembly C at the same time, wastewater is discharged after the desorption by the MCDI assembly B, the MCDI assembly A, the MCDI assembly B, and the MCDI assembly C work sequentially and alternately to realize continuous water passage desalination and continuous recovery of energy released during the desorption by the MCDI assembly, and the secondary fresh seawater is connected to the post-filtering unit to be treated to obtain direct-drinking fresh water, wherein the self-pressurization energy recovery device in the SWRO treatment unit comprises: a reversing valve, a center valve block, a pilot valve, a hydraulic cylinder A, and a hydraulic cylinder B;

for the center valve block, two side walls of the center valve block are connected with the hydraulic cylinder A and the hydraulic cylinder B respectively, a piston assembly is provided in the hydraulic cylinder A and the hydraulic cylinder B, a piston rod hole is formed in the center valve block, two ends of a piston rod of the piston assembly extend into the hydraulic cylinder A and the hydraulic cylinder B respectively, a rod body of the piston rod penetrates through the piston rod hole, a pilot valve channel is arranged in a lower part of the center valve block and configured to place the pilot valve, a reversing valve channel is arranged in an upper part of the center valve block and configured to place the reversing valve, and a plurality of flow passages are arranged in the center valve block;

for the hydraulic cylinder A and the hydraulic cylinder B, the hydraulic cylinder A and the hydraulic cylinder B are divided into six chambers by the piston assembly, the piston assembly sequentially divides the hydraulic cylinder A into a seawater chamber A, a transition chamber A, and a concentrated water chamber A from left to right, the piston assembly sequentially divides the hydraulic cylinder B into a seawater chamber B, a transition chamber B, and a concentrated water chamber B from right to left, and a cross sectional area of the seawater chambers is smaller than a cross sectional area of the concentrated water chambers;

for the pilot valve, the pilot valve is located between the concentrated water chamber A and the concentrated water chamber B, two ends of a valve rod of the pilot valve extend to the concentrated water chamber A and the concentrated water chamber B respectively, five holes are formed in the pilot valve channel, namely, an outflow hole I, an inflow/outflow hole II, an inflow hole III, an inflow/outflow hole IV, and an outflow hole V from left to right, the outflow hole I is communicated with a discharged seawater outlet end to form a ninth channel, the outflow hole V is communicated with the discharged seawater outlet end to form a tenth channel, and the inflow hole III is communicated with a seawater inlet end to form a first channel;

for the reversing valve, a seawater hole I, a concentrated water hole II, a concentrated water hole III, a concentrated water hole IV, a concentrated water hole V, a concentrated water hole VI, and a seawater hole VII are formed in the reversing valve channel from left to right respectively, the seawater hole I is communicated with the inflow/outflow hole II of the pilot valve to form a second channel, the seawater hole VII is communicated with the inflow/outflow hole IV of the pilot valve to form a third channel, the concentrated water hole II and a depressurized concentrated seawater outlet form a seventh channel, the concentrated water hole VI and the depressurized concentrated seawater outlet form an eighth channel, the concentrated water hole III is communicated with the concentrated water chamber A to form a fourth channel, the concentrated water hole V is communicated with the concentrated water chamber B to form a fifth channel, and the concentrated water hole IV is communicated with a high-pressure concentrated seawater inlet end to form a sixth channel;

for a check valve A, a check valve B, a check valve C, and a check valve D, a rectangular flow passage is formed in the center valve block, the check valve A, the check valve B, the check valve D, and the check valve C are sequentially arranged at four top corners of the rectangular flow passage counterclockwise, the seawater chamber A is communicated with the check valve A and the check valve C through a flow passage, and the seawater chamber B is communicated with the check valve B and the check valve D through a flow passage, wherein a thrust required for pushing the check valve A and the check valve B open is smaller than a thrust required for pushing the check valve C and the check valve D open, the pretreated seawater flows to the seawater chamber A from the check valve A, the high-pressure seawater of the seawater chamber A flows to the check valve C and makes the check valve C opened and the check valve A closed, the pretreated seawater flows to the seawater chamber B from the check valve B, and the high-pressure seawater of the seawater chamber B flows to the check valve D and makes the check valve D opened and the check valve B closed; and the high-pressure concentrated seawater controls the movement of the piston assembly, when the piston assembly moves to a position close to a limit position, the pilot valve is pushed to move, the pilot valve controls the reversing valve to be reversed, the reversing valve also moves accordingly, purpose of alternately pressurizing and depressurizing the hydraulic cylinder A and the hydraulic cylinder B is achieved, the check valve A and the check valve B control the inflow of the low-pressure raw seawater, and the check valve C and the check valve D control the outflow of the pressurized seawater.

2. The SWRO and MCDI coupled seawater desalination device system with energy recovery according to claim 1, characterized in that the pre-filtering unit comprises a raw water pump, a multi-medium filter, and a micro-filter sequentially connected through a pipeline, and the raw seawater is treated by the raw water pump, the multi-medium filter, and the micro-filter to obtain the pretreated seawater.

3. The SWRO and MCDI coupled seawater desalination device system with energy recovery according to claim 1, characterized in that the post-filtering unit comprises a polypropylene (PP) cotton filter and an active carbon filter sequentially connected through a pipeline, and the secondary fresh seawater is treated by the PP cotton filter and the active carbon filter to obtain the direct-drinking fresh water.

4. The SWRO and MCDI coupled seawater desalination device system with energy recovery according to claim 1, characterized in that the MCDI assembly A, the MCDI assembly B, and the MCDI assembly C all comprise 4N MCDI modules connected in parallel, where N is a positive integer.

5. The SWRO and MCDI coupled seawater desalination device system with energy recovery according to claim 4, characterized in that the MCDI module comprises a shell, a partition plate, an anion-cation exchange membrane, and an electrode, a primary fresh seawater inlet, a secondary fresh seawater outlet, a pretreated seawater inlet, and a wastewater outlet are formed in the shell, and a space formed by the shell and the electrode forms a parallel internal water flow channel.

6. The SWRO and MCDI coupled seawater desalination device system with energy recovery according to claim 1, characterized in that the MCDI treatment unit controls switching of different circuits through an electric control unit to recover energy released during the desorption in the MCDI assemblies.

7. The SWRO and MCDI coupled seawater desalination device system with energy recovery according to claim 6, characterized in that the different circuits are sequentially a parallel-serial circuit, a parallel-parallel circuit, a parallel-parallel-serial-parallel circuit, a parallel-serial-parallel-parallel circuit, and a serial-parallel circuit.

8. The SWRO and MCDI coupled seawater desalination device system with energy recovery according to claim 1, characterized in that the SWRO treatment unit performs desalination in the high-concentration section to desalinate the pretreated seawater with the ion concentration of 35,000 mg/L to the primary fresh seawater with the ion concentration of about 1,700 mg/L, and the MCDI treatment unit performs desalination in the low-concentration section to desalinate the primary fresh seawater with the ion concentration of 1,700 mg/L to the secondary fresh seawater with the ion concentration of 500 mg/L or below.

* * * * *